United States Patent
Shaw et al.

(10) Patent No.: US 6,950,828 B2
(45) Date of Patent: *Sep. 27, 2005

(54) METHOD AND APPARATUS FOR BUILDING AND MAINTAINING AN OBJECT-ORIENTED GEOSPATIAL DATABASE

(75) Inventors: Kevin B. Shaw, Gulfport, MI (US); Miyi J. Chung, Tarrytown, LA (US); Maria A. Cobb, Hattiesburg, MS (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 183 days.

This patent is subject to a terminal disclaimer.

(21) Appl. No.: 10/662,171

(22) Filed: Sep. 10, 2003

(65) Prior Publication Data

US 2005/0091223 A1 Apr. 28, 2005

Related U.S. Application Data

(62) Division of application No. 09/448,765, filed on Nov. 24, 1999, now Pat. No. 6,684,219.

(51) Int. Cl.$^7$ ................................................ G06F 7/00
(52) U.S. Cl. .................................. 707/103 R; 707/102
(58) Field of Search .............................. 707/102–104.1; 709/217

(56) References Cited

U.S. PATENT DOCUMENTS

| | | | | |
|---|---|---|---|---|
| 5,629,981 A | * | 5/1997 | Nerlikar | 340/10.31 |
| 5,692,183 A | * | 11/1997 | Hapner et al. | 707/100 |
| 5,848,419 A | * | 12/1998 | Hapner et al. | 707/100 |
| 6,016,495 A | * | 1/2000 | McKeehan et al. | 707/102 |
| 6,029,173 A | * | 2/2000 | Meek et al. | 707/102 |
| 6,088,702 A | * | 7/2000 | Plantz et al. | 345/733 |
| 6,091,810 A | * | 7/2000 | Shaffer et al. | 379/211.02 |
| 6,131,087 A | * | 10/2000 | Luke et al. | 705/26 |
| 6,161,105 A | * | 12/2000 | Keighan et al. | 707/100 |

OTHER PUBLICATIONS

Chung et al., "Object–Oriented Database Exploitation Within the GGIS Data Warehouse", Jan. 17, 1997, Naval Research Laboratory, pp 1–26.*

* cited by examiner

*Primary Examiner*—Greta Robinson
*Assistant Examiner*—Sathyanarayan Pannala
(74) *Attorney, Agent, or Firm*—Thomas D. Robbins; John J. Karasek

(57) ABSTRACT

An object-oriented system for building and maintaining a spatial data structure for use in topological applications. The data is organized in a database which incorporates spatial feature location, attributes, and metadata information in a relational framework across a hierarchy. The system provides for the instantiation of the objects and levels that make up the database and for spatially indexing the data among the objects across hierarchical levels. The data can be updated while preserving the spatial linking among objects and levels, and the data can be exported to a relational vector product format database.

7 Claims, 13 Drawing Sheets

METHOD AND APPARATUS FOR BUILDING AND MAINTAINING AN OBJECT-ORIENTED GEOSPATIAL DATABASE

The present application is a divisional application of U.S. patent application Ser. No. 09/448,765, having a filing date of Nov. 24, 1999, now U.S. Pat. No. 6,684,219.

BACKGROUND OF THE INVENTION

1. Field of the Invention

The present invention relates to database construction and maintenance within object-oriented programming paradigms. More specifically, the invention relates to a method and apparatus for building and maintaining an object-oriented database of geospatial data for use with the development and maintenance of topological maps consistent with the Vector Product Format, Raster Product Format, and Text Product Standard developed for use by the U.S. Defense Mapping Agency, now known as the National Imagery and Mapping Agency.

2. Description of the Related Art

The use of maps and geographical characteristics has expanded well beyond the navigator, the cartographer, and the classroom the independent field of topology, which is the study of the characteristics, such as adjacency and contiguity, of geometrical objects that are independent of the underlying coordinate system. The primary purpose for providing topological information in contemporary geographic information systems is to expand spatial analysis capabilities. The National Imagery and Mapping Agency (NIMA) is one of many entities that require timely, relevant, and accurate imagery and geospatial information. NIMA maintains and disseminates databases of geographical data in three main formats: Vector Product Format (VPF), Raster Product Format (RPF), and Text Product Standard (TPS).

While the present invention is directed primarily toward VPF products, a brief introduction to the RPF and TPS formats is presented because the present invention provides for the first time a system that can incorporate into a single platform geospatial data structured in all three formats.

Raster Product Format (RPF) is defined in MIL-STD-2411, 2411-1, and 2411-2 and was developed to facilitate the interchange of raster data between producers and users of raster data by providing a standard database structure for arrays of pixel values. RPF is a standard data structure for geospatial databases composed of rectangular arrays of pixel values (e.g., digitized maps or images) in compressed or uncompressed form. Data in RPF form is intended to be used by application software on computer-readable interchange media, such as CD-ROM's, directly without further manipulations or transformation. RPF products include those generated from scanned charts, such as those stored in Compressed Arc Digitized Raster Graphics (CADGR), as well as SPOT imagery, such as Controlled Image Base (CIB). In general, RPF data is organized into frame and subframe files. Each frame file contains data for a specific geographical region, defined by a boundary expressed by four (4) latitude/longitude coordinates for a rectangular geographic area. Each frame file also includes a fixed number of data values decomposed into a matrix of subframes, representing color, value, or intensity of the corresponding point. Each product category that represents a single instantiation of RPF, or a family of instantiations of RPF, is described in a separate product specification.

Text Product Standard (TPS) is a textual format using Standard Group Mark-up Language (SGML). TPS provides digital textual information from NIMA hardcopy publications, such as the AMERICAN PRACTICAL NAVIGATOR and SAILING DIRECTIONS. Its information is basically in SGML format. For example, navigators can use TPS data to augment paper or digital charts with valuable information, including accurate directions.

Vector Product Format (VPF) is a standard U.S. Depart of Defense (DOD) format for vector-based digital map products and is defined by U.S. Military Specification MIL-STD-2407, DOD Interface Standard, Vector Product Format, 1996, which is incorporated herein by reference. NIMA, the primary mapping agency for the DOD, developed this standard and is producing an increasing number of digital products in this format. VPF is a standard relational format, structure, and organization for large geographic databases that is based on a georelational vector data model and is intended for direct access by application software. NIMA produces its vector digital map products in this format and offers VPFView as a software application that allows users to browse, display, and perform spatial queries on NIMA data in VPF. NIMA VPF products contain source data from maps, air photographs, satellite data, etc. Other software developers have developed a variety of applications to use and display NIMA-produced VPF data. For example, Environmental Systems Research Institute, Inc. (ESDI) has developed ArcInfo and ArcView to access this data, perform queries, and generally utilize the data within geographic information systems (GIS).

VPF represents a georelational framework based on a vector data model that is well suited to hold data for large geographic databases. Georelational digital vector data are connected points that represent natural and cultural geographic features. Various levels of spatial relationships can be represented in a vector data base such as the VPF data structure. A VPF database comprises three basic types of information for spatial features: spatial geometric properties (locations), non-spatial properties (attributes), and topological properties (relationships). This data is organized into a hierarchical structure of directories, tables, and indices. The root directory for a finite VPF database contains a number of library subdirectories, each representing a specific geographic region and scale. Within each library subdirectory are one or more coverage subdirectories, each representing a related group of feature classes. Each coverage subdirectory contains tables and indices describing its feature classes by attribute (non-spatial) and primitive (spatial) data. Feature data is further subdivided among tile subdirectories within each feature class. Each tile represents a spatial subregion within the library boundaries.

Referring now to FIG. 1, a typical prior art VPF data structure 100 is shown as a relational database with four hierarchical levels: a database level 10; a library level 12; a coverage level 14; and a feature level 16. Within these levels, VPF data is maintained in various types of relational database tables, which are stored as files. VPF tables are ASCII or binary files within the directories that are structured as one or more "columns", or fields for different kinds of information, and many "rows" of records for each information type. Such tables are used to store feature, attribute, location, geometry, and topology information within the VPF structure. Indices are a special kind of table which have pointers to other tables and records.

At the top level of the VPF structure 100 is the database level 10, a logical collection of data managed as a unit. Each database will contain one or more libraries 11, which are generally organized along a geographic categorization, such as political units or latitude/longitude rectangles. An example of a library is the North American continent. Within each library, the data is organized into coverages 13, which represent features that are thematically and topologically related to each other. Boundaries, rivers, and transportation could all be examples of coverages are broken down into feature classes 15, each of which represents a homogeneous set of attributes. Transportation features could be roads, railroads, and airports. Feature classes 15 represent areas, lines, points, and/or text and consist of primitive data 17 and attribute data 18. Primitive data 17 describes the location, geometry, and topology of the features with coordinates, or topologically linked sets of nodes, edges, and faces. Attributes 18 are non-spatial data, modeling the thematic information about the features. Because both primitive 17 and attribute 18 information reside in the VPF data structure 100, both spatial (where) relationships and thematic (what) relationships can be modeled with VPF data. Spatial relationships, or topology, include adjacency, connectivity, intersection, containment, and composition.

FIG. 2 displays a block diagram of the hierarchical directory/file structure of the VPF data structure. A typical VPF product has a VPF database directory 20 containing pointers to each of the VPF libraries within each VPF database. Each library has a predefined geographic extent and source scale. Each library directory 22 has coverage subdirectories 24 where linked feature tables 26 store detailed information about thematically similar geospatial features (e.g., transportation, vegetation) and their attributes over the geographic extent of the library. Each feature table 26 includes primitives tables 28 and attributes tables 29. The information retained in these last two structures provide the physical representations of the geographical structures within each coverage level. The primitive tables 28 provide the location, geometry, and topology information of for each coverage level, using winged-edge topology in terms of areas, lines, points, and text. The attributes tables 29 provide physical characteristic information regarding each geographical structure within the coverage level. To facilitate faster access to primitive data, most VPF primitive tables 28 are tiled. Tiles are physical, as opposed to thematic, partitions of data of equal size utilized to break apart large blocks of data into manageable segments. Primitive tables 28 are stored in tile directories 27 within a VPF coverage. Under this structure, topology among VPF features is maintained only within each coverage.

The VPF software offered by NIMA is limited to simple map viewing. VPFView reads a VPF product database, produces user-defined views, and displays those views to the user. The user-built views can be saved to disk and subsequently reloaded for later viewing. While VPFView can be used to query the VPF database, it is limited to simple inquiries because VPFView was never designed to perform sophisticated GIS functions. Further, access to VPF data through non-NIMA software, such as ESDI's ArcView, often requires prior translation of the VPF database, a process both time-consuming and subsequently restrictive to whatever version of the VPF database existed at the time of translation. Additionally, use of the VPF to dynamically analyze topological information is not possible with any VPF-compatible system presently available. For example, within VPF, a bridge has an existence attribute; i.e., the bridge exists. If the user desires to view and analyze geospatial information in the absence of the bridge, the underlying relational VPF database must first be modified to change the existence attribute for this particular feature—a complex and time-consuming process that requires the updating of all related tables and files.

The VPF structure is known as a "relational" structure, because pointers and links join, or relate, the various primitives tables 28 and attributes tables 29 within each coverage level. Without this "relational" structure, the data would contain nothing more than simple geometry of the coverage features and not also their topology. This relationship makes VPF products attractive to users of geographic information systems, where spatial analysis is important.

VPF data is stored according to the structure defined in MIL-STD-2407. The Standard specifies the structure for directories, tables, table columns, table join relationships, and media exchange conventions for all VPF data. The data structure itself can be thought of as a template or skeleton within which the geospatial features and metadata are stored. While this standard describes the structure, it does not describe the contents of a set of VPF data; this is the role of a VPF product specification. A product specification corresponding to a specific database product stipulates the precise contents of feature tables and their relationships in the database. In this context, each separate product is defined by a product specification implemented with a VPF structure. Just as different types and scales of maps may be created for a geographic area, each designed for a different use, there are several types of VPF products with differing levels of feature content and density. Each official VPF product is defined by a different military specification describing the particular VPF structure to be utilized. Specification information includes which features, attributes, and attribute values will be allowed in the product as well as how the features will be grouped into coverages and what tiling scheme, if any, will be used. Currently, there are several VPF products being produced by NIMA.

In geographic applications, topology refers to any geographic relationship between connected geometric primitives that is not altered by continuous transformation. VPF recognizes four levels of topology:

Level 0—boundary representation, containing no explicit topological information, for manipulating purely geometric aspects of the spatial data;

Level 1—non-planar graph, suitable for representing networks;

Level 2—planar graph, in which no edges overlap; and

Level 3—full topology, in which no faces overlap.

Level 3 is the most complex topological structure to manage in VPF databases, and winged-edge topology is the format that has been selected for representing level 3 coverages within the VPF database. The function of winged-edge topology is to provide line network and face, topology. Three components are necessary to define winged-edge topology: node information, edge information, and face information. An edge knows its neighboring edges by its right edge and left edge attributes. An edge, together with its left and right edges, gives a 'winged' appearance, leading to the term "winged-edge" topology. Referring now to FIG. 3, an edge 30 has a start node 31, which is connected to the left edge 32, and an end node 33, which is connected to the right edge 34. A neighboring edge 35 is any edge that shares a start node 31 or end node 33 with the original edge 30. Nodes provide contiguity information; for example, each edge 30 knows its start node 31 and end node 33. Start and end nodes also provide orientation information for edges, and define the common point for contiguous edges.

Adjacency information is also maintained by edges. An edge 30 knows its neighboring edges 35 by its right edge 34 and left edge 32 attributes. An edge 30, together with its left 32 and right 34 edges, gives a 'winged' appearance, leading to the term winged-edge topology. The right edge 34 is the first edge connected to the end node 33 in a counterclockwise direction. The left edge 32 is the first edge connected to the start node 31 in a counterclockwise direction. If there is no neighboring edge 35, the right 34 or the left 32 edge will exist by itself. Each edge also knows its left and right faces, 35 and 36, respectfully. Left 35 and right 36 faces are determined by the edge direction. With these definitions, winged-edge topology provides adjacency, contiguity, and the orientation of neighboring nodes, edges, and faces.

Due to the above rules for level 3 topology, any single line feature may consist of multiple edges; and any single node, edge, or face primitive could be used by more than one feature. Therefore, great care must be taken to maintain the correct linkages between the features and primitives. These complexities place a heavy burden on the maintenance of topological relationships following changes in feature data, especially in a relational database such as the VPF database. With a complex relational database model such as the vector product format, the coverage, features, and topological data resides in many tables that must be queried for every request for information from the database. Furthermore, because of the number of tables involved, maintaining referential integrity of the VPF database upon an update is very difficult. This difficulty arises because the VPF format relies on data residing within multiple specialized tables on multiple levels of the VPF relational database.

Although applications exist to view geospatial data in any of the VPF, RPF, and TPS data formats, no single software product exists to view, query, or manipulate all three formats on a one platform. Therefore, users must access separate programs to utilize data in each format. Cross-referencing data produced in different formats is difficult at best, thereby limiting the speed of assimilating the data and limiting the ability to query and display data from a variety of sources.

The present inventors have recognized that an object-oriented paradigm provides certain benefits for geographical databases. With an object-oriented data structure, topological and other spatial relationships reside in linked objects, and updates to the data can be handled more simply and directly. This is due to the object-oriented properties of identity, encapsulation, inheritance, and polymorphism. The preferred embodiments of the present invention overcome the problems associated with existing mechanisms for querying, updating, and translating VPF data by providing a geospatial information distribution system that permits easy and complete updating of VPF data, more complex queries of VPF data, and direct exporting of VPF data into a relational database structure. The present invention also permits easy use of data of differing formats and structures within an integrated geospatial information system. In particular, the invention incorporates existing data in VPF, RPF, and TPS files onto a single, object-oriented platform for GIS inquiry.

SUMMARY OF THE INVENTION

A primary object of the present invention is to provide a geospatial query and update mapping system that permits easy exporting of data from an object-oriented geospatial database to a relational VPF database.

Another object of the present invention is to provide a geospatial information distribution system that permits easy and complete updating of vector product format data.

A further object of the present invention is to provide a geospatial information distribution system that allows a user to rapidly build a user-specified topological display from a database having vector, raster, and/or text data.

Objects and advantages of the present invention are achieved in accordance with embodiments of the present invention, such as a method of building and maintaining an object-oriented database from a vector product format (VPF) database, including instantiating objects of the object-oriented database, using the VPF database; initializing spatial and non-spatial feature data of the object-oriented database; spatially indexing data among objects across hierarchical levels of the object-oriented database; updating data of the object-oriented database; and exporting the contents of the updated object-oriented database to the VPF database.

Objects and advantages of the present invention are further achieved in accordance with embodiments of the present invention, such as a method of building and maintaining an object-oriented spatial database from at least two of a vector product format (VPF) database, a raster product format (RPF) database, and/or a text product standard (TPS) database, including instantiating objects of the object-oriented database, using at least two of the VPF, RPF, and TPS databases; initializing spatial and non-spatial feature data of the object-oriented database; and spatially indexing data among objects from the at least two VPF, RPF, and TPS databases into the single, object-oriented spatial database.

Objects and advantages of the present invention are further achieved in accordance with embodiments of the present invention, such as a method of building and maintaining an object-oriented database from a VPF database, including instantiating objects of the object-oriented database, using the VPF database; initializing spatial and non-spatial feature data of the object-oriented database; spatially indexing data among objects across hierarchical levels of the object-oriented database; and updating spatial and non-spatial data.

The step of initializing spatial and non-spatial feature data preferably creates a feature level of non-spatial attribute data, which provides characteristic properties of each feature, and spatial data, including primitive data and topological information, which provides spatial relationships between the feature and other features within a specified coverage, and wherein related non-spatial and spatial data are directly accessible from the feature object. Updating spatial and non-spatial data includes adding, changing, and deleting feature, primitive, and topological data within the database and further includes updating all object links referencing the feature, primitive, and topological data. The step of spatially indexing data is applied to one or more flat file, raster product format, vector product format, or text format databases. Data objects can be retrieved from the object-oriented database through user-specified queries, in which the object-oriented database is searched by feature attributes, geometrical constraints, topological constraints, and/or geographical constraints. The retrieved data objects from the query can include flat files, raster images, VPF features, and textual data.

Objects and advantages of the present invention are achieved in accordance with embodiments of the present invention, such as a method of creating an object-oriented database from a relational geospatial database with feature objects having non-spatial data, which provides characteristic properties of each feature, and spatial data, including primitive data and topological information, which provide spatial relationships between a feature object and other feature objects within a specified coverage, wherein related non-spatial and spatial data are directly accessible from the feature object.

Objects and advantages of the present invention are achieved in accordance with embodiments of the present invention, such as a method of searching an object-oriented hierarchical database of spatial data, including listing all databases containing feature data of a user-selected spatial point of interest; listing all libraries, within a user-selected database from the list of databases, containing data intersecting the user-selected spatial point of interest; listing coverages and features, within a user-specified library from the list of libraries; and listing objects from the user-selected database that satisfy a user-selected point of interest and user-selected coverages and/or features, wherein the listed objects include flat files, raster images, VPF features, and textual data.

The database is searchable by one or more of the following data characteristics: feature attributes, geometrical constraints, topological constraints, and geographical constraints.

Objects and advantages of the present invention are achieved in accordance with embodiments of the present invention, such as a computer readable medium encoded with software to build and maintain an object-oriented, hierarchical database from a vector product format (VPF) database.

Objects and advantages of the present invention are achieved in accordance with embodiments of the present invention, such as a computer including a storage medium storing an object-oriented, hierarchical database based on a VPF database; a processor spatially indexing data among objects across hierarchical levels of the object-oriented hierarchical database; a processor searching the object-oriented hierarchical database in response to a user-specified query; and a graphical user interface for accepting the user-specified query and for displaying the results of the object-oriented database search.

Objects and advantages of the present invention are achieved in accordance with embodiments of the present invention, such as a computer program embodied on a computer-readable medium to access an object-oriented spatial database, including a construction code section to build a hierarchy of spatial data, including the levels of library, coverage, and feature data; an addition code section to add data associated with one or more of the hierarchical levels; an indexing code section to spatially index data among objects across hierarchical levels of the object-oriented database; a change code section to update data associated with one or more of the hierarchical levels; and a query code section to search the object-oriented database for user-specified features and to view the search results.

Objects and advantages of the present invention are achieved in accordance with embodiments of the present invention, such as a four-dimensional data structure embodied on a computer-readable medium for building and maintaining an object-oriented spatial database, with the four-dimensional data structure being structured according to database, library, object, and primitive levels; the data at each level being spatially indexed to the data above and below each said level; and the data within the object-oriented spatial database being exported to a relational database in vector product format (VPF).

Objects and advantages of the present invention are achieved in accordance with embodiments of the present invention, such as an apparatus for building and maintaining an object-oriented hierarchical database of spatial data, including a processor spatially indexing objects across hierarchical levels of the object-oriented database such that the spatial data is linked to objects located at levels higher and lower than itself; a storage device on a computer-readable medium on which is stored the object-oriented hierarchical database; a processor updating the spatial data such that the data shared among features is retained; and an output device displaying to a user results of a user-specified query of the object-oriented hierarchical database.

Objects and advantages of the present invention are achieved in accordance with embodiments of the present invention, such as an apparatus for building and maintaining an object-oriented hierarchical database of spatial data, including processor means for transforming data into a linked hierarchical structure; storage means for storing spatially-linked hierarchical data on a computer-readable medium; input means for entering update data for the object-oriented hierarchical database; input means for entering database query instructions; processor means for selecting object-oriented database objects and features that satisfy the database query; and output means for displaying the object-oriented database objects and features that satisfy the database query.

BRIEF DESCRIPTION OF THE DRAWINGS

These and other objects and advantages of the present invention will become more apparent and more readily appreciated from the following description of the preferred embodiments, taken in conjunction with the accompanying drawings, of which.

DESCRIPTION OF THE PREFERRED EMBODIMENTS

Figure 1:
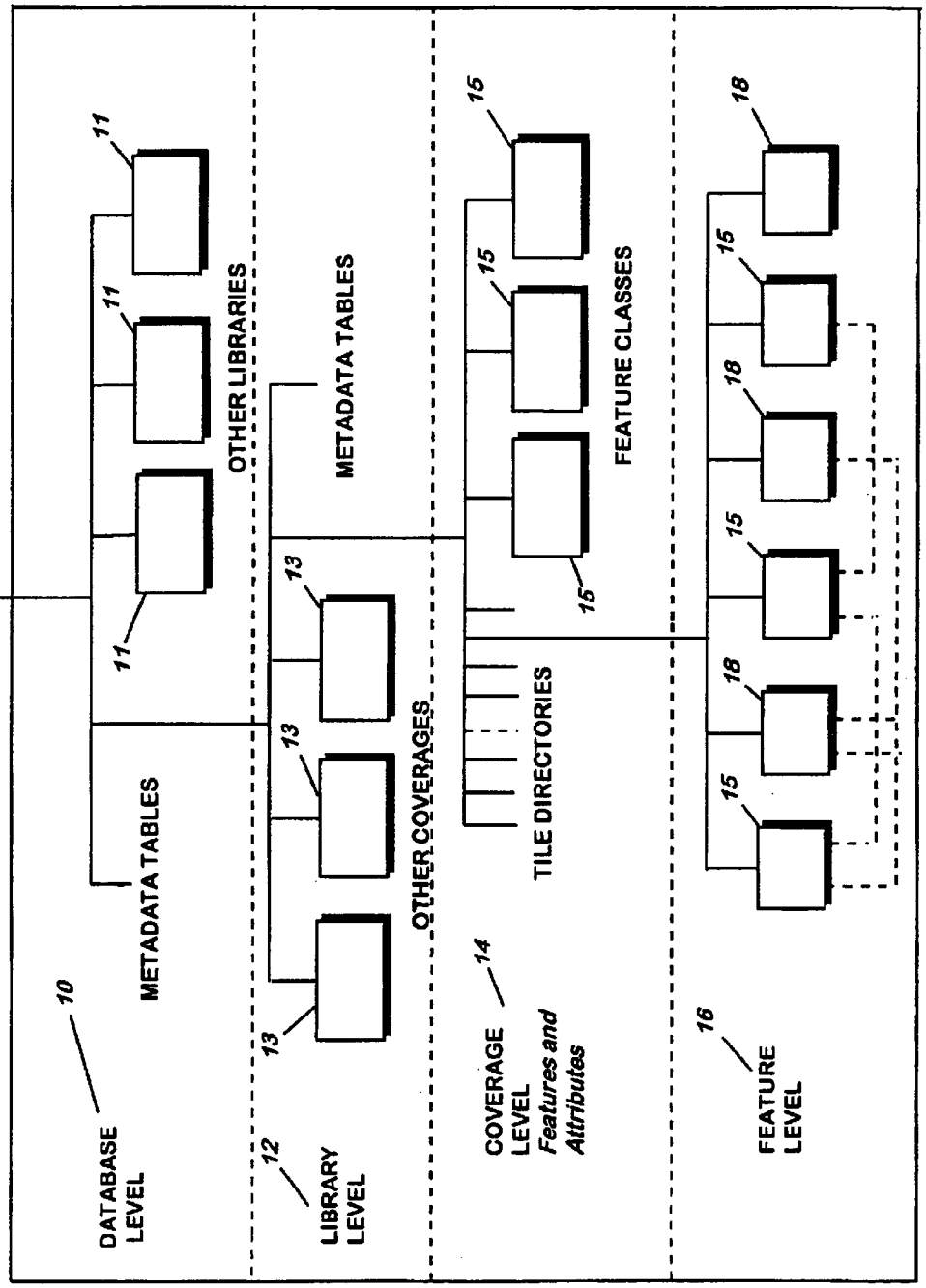
FIG. 1 is a block diagram of the relational VPF data structure as developed by NIMA.

A preferred embodiment of the invention is readily implemented on existing hardware-independent processing platforms with sufficient computer-readable storage for building, maintaining, and querying a sufficiently large object-oriented database to support the data of a VPF file.

At a threshold level, it may be helpful to discuss some of the basic distinctions between the object-oriented approach to data storage and retrieval and the georelational approach as is found in the present relational VPF data structure. In the georelational approach, all data is organized into tables of rows and columns, and a given row's identity is based on its primary and secondary key values. Query and analysis procedures are external to the data tables and are maintained independently of them. As the data structures change, so must the query and analysis procedures. Also, as the data structures become more complex, keeping the data synchronized with each other through an updating process becomes increasingly difficult. This difficulty is removed by the object-oriented approach of the present invention.

In the object-oriented paradigm, objects are viewed as data elements that know what kinds of operations they can perform and how to perform them. In other words, the query and analysis procedures are distributed among all the objects, rather than being external to and manipulating isolated data elements. This is the principle of encapsulation. The result is a much tighter coupling between a data structure and the procedures that are concerned with it, which facilitates easier and faster maintenance to keep the data and procedures synchronized, even during updates. Another distinction is that each object has a unique identity, and holds direct pointers to its component objects' identities, resulting in inherent support for complex object webs without the need for application software to maintain primary and secondary key values. Each object may in turn be composed of other objects, which have pointers to any other objects, in a "containment hierarchy". These pointers may be for attribute data (analogous to columns in the relational approach), or direct links to other complex objects (analogous to the secondary keys in the relational approach).

The object-oriented approach of the present invention is more intuitive than the relational approach, in that each data component in an object-oriented database corresponds directly to the feature being modeled and contains all information relevant to that feature in a single, coherent structure. This characteristic of the object-oriented approach alone eliminates the constant, costly table linking necessary for relational databases to function.

Within the object-oriented paradigm, a class contains instances modeling real world entities. Each object is the member of a class, with the class being a template for creating a certain kind of object. Therefore, every object of a class has properties in common with other objects of that class. A class in turn may derive attributes and methods from another class. This familiar feature of object-oriented hierarchical is known as inheritance. Inheritance reduces the amount of duplicated data by allowing generalizations of data to be made at a higher level and then propagated through the hierarchy. For example, consider a transportation route class which contains subclasses such a highway, railroad, and shipping lanes. Information common to all such transportation routes, such as surface, width, and start/end points, can be collectively defined at the transportation class level. All instances of this class are then known to have these properties. In addition, specialized information such as the surface material, width of the route, etc. can be defined with each subclass.

Related to the characteristic of inheritance in object-oriented databases is the principle of composite objects, which are "complex" objects that are composed of other objects. For example, a car object is composed of a body, an engine, tires, etc., each of which is an object in itself. In the present invention, each VPF/RPF/TPS object is considered as a composite object because of its complex data structure. As discussed above, the relational model uses secondary keys to maintain this type of dependency information, which results in performance and referential integrity problems. In object-oriented databases these relationships are maintained through direct pointer links in which each object contains a direct pointer to any other object upon which the first object is dependent. Moreover, these pointers are maintained by the system, which guarantees that each object identifier is unique and that referential integrity is maintained upon update (e.g., if a referenced object is deleted, all references to that object are automatically updated).

To utilize the present object-oriented geospatial approach to manipulating and viewing digital topological data, the object-oriented database must first be built from the VPF/RPF/TPS data. Once constructed, the object-oriented VPF file can be queried, updated, and exported with ease as will be discussed below.

Figure 4:
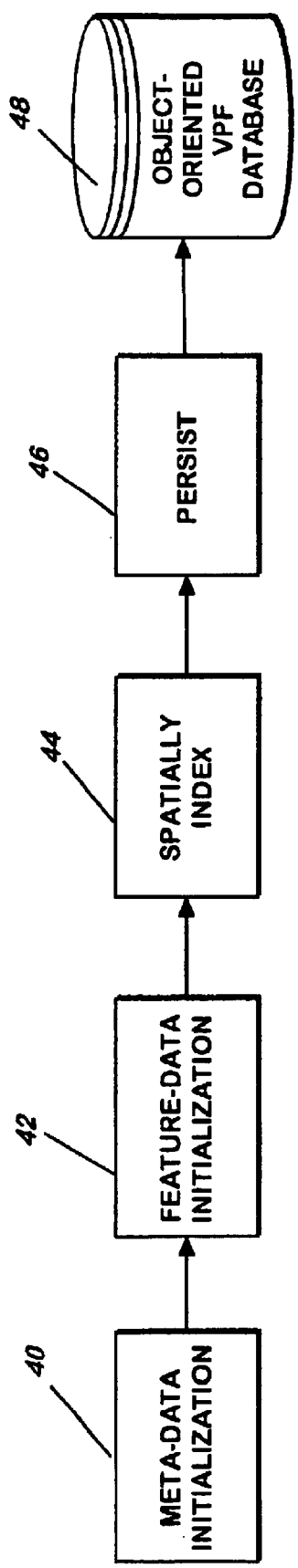
FIG. 4 is a flow chart of the creation of an object-oriented VPF database.

The steps for constructing the object-oriented VPF database are shown in FIG. 4. Initialization for VPF databases is the process through which data is input from the original VPF data structure and transformed to fit the object-oriented schema, and is represented by steps 40–44 in FIG. 4. This process involves reading the relational VPF tables and piecing together information that is logically related into objects. For example, the information related to a single bridge feature contains primitive information (geographic coordinates) stored in one table and attribute information (height, bridge type, etc.) stored in another table. The algorithm for gathering the information from the relational VPF database includes taking this physically disjointed information and making it logically coupled in an object structure. Placing the data in an object-oriented structure speeds data access and facilitates updates. Both the metadata and feature data initialization at steps 40 and 42, respectively, involve reading relational VPF tables to collect information to completely define a spatial feature. Furthermore, the initialization process is also a transformation process that takes piecewise information stored in disjointed tables and objectifies a spatial feature as a complex object within the object-oriented VPF database. The initialization of the object-oriented VPF database 48 at steps 40 and 42 is shown in greater detail in the flow charts of FIGS. 5 and 6. The spatial indexing of the object-oriented VPF database at step 44 to reference data from VPF, RPF, and TPS structures is discussed in greater detail below regarding FIGS. 7 and 8.

Figure 5:
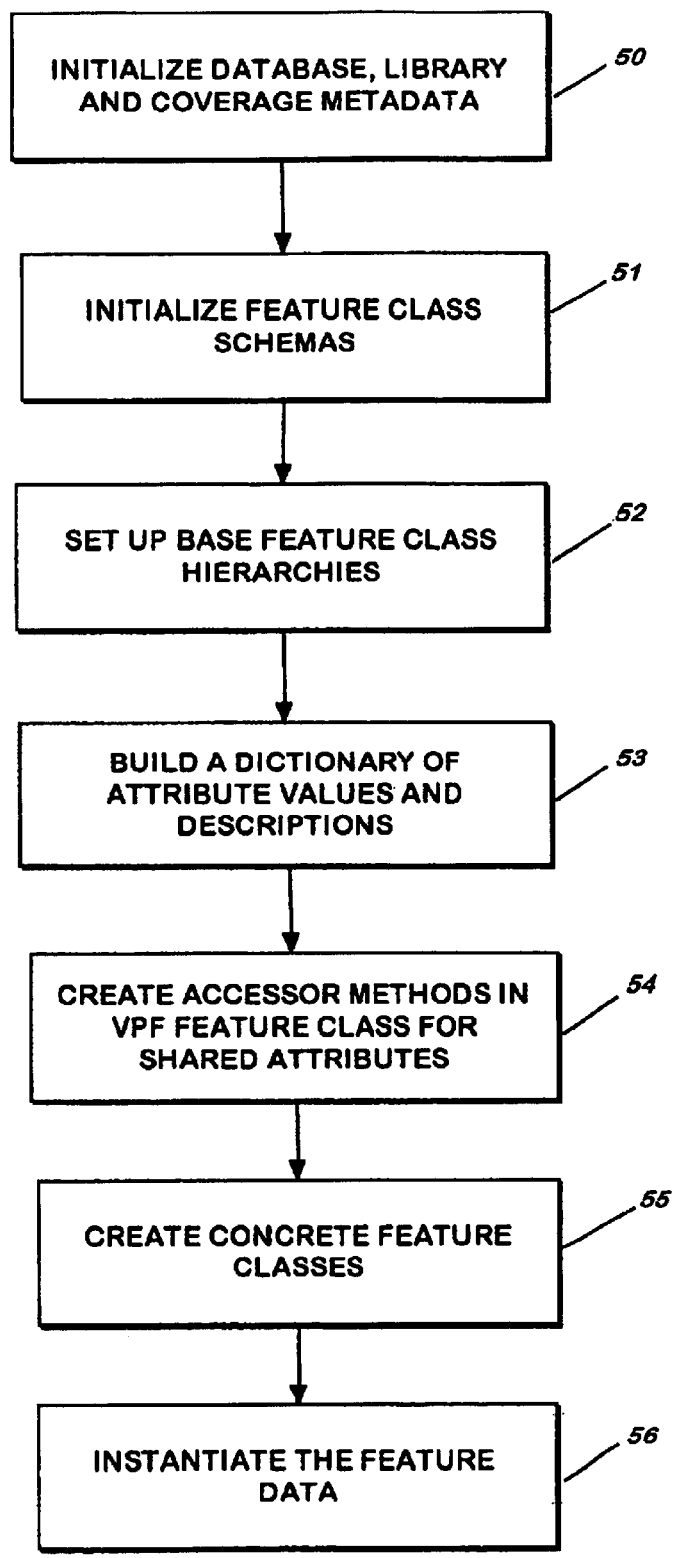
FIG. 5 is a flow chart of the initialization of the object-oriented VPF database from a relational VPF database.

Referring now to FIG. 5, the initialization process as shown in FIG. 5 is designed as a generic algorithm to work with any VPF database. Therefore, much of the class schema and hierarchies are generated during the initialization process, rather than having to develop static schemas for each VPF database. For each level of the database structure (database, library, coverage and feature), metadata information is extracted from the relational VPF structure to facilitate interpretation of the of the data at each level. During step 50, metadata tables are constructed by dynamically analyzing the hierarchical structure of the VPF database, including its directories, subdirectories, and tables. The metadata consists primarily of a header at the beginning of each VPF data table containing the schema for parsing that table, and join tables for linking records among the feature, primitive, and attribute tables. Corresponding object schema are generated from the metadata tables to begin the actual construction of the object-oriented VPF database. The process continues at step 51 with the creation of feature class definitions based on the information derived from the coverage-level tables. This information is then used in step 52 for creating feature class hierarchies. For example, a feature class template for bridge lines is produced as a subclass that will be given actual attribute names and coordinate points at step 56.

At this point, the creation of the object schema, or metadata, has been completed, and the remainder of the initialization process focuses on filling the object-oriented VPF database with concrete data.

Step 53 parses the relational VPF feature tables and builds a dictionary of the attribute values and descriptions from these tables. This data is used by the system as a reference during querying and analysis. At step 54, access methods by which shared attributes in the VPF feature objects can be retrieved and can be modified are added to the object schema. Actual feature classes are then generated at step 55. The process concludes with the instantiation of the actual feature data at step 56. For example, a VPF bridge line feature is. created that has coordinate and attribute values provided from the VPF database. The instantiation details of step 56 are discussed with reference to FIG. 6.

Figure 2:
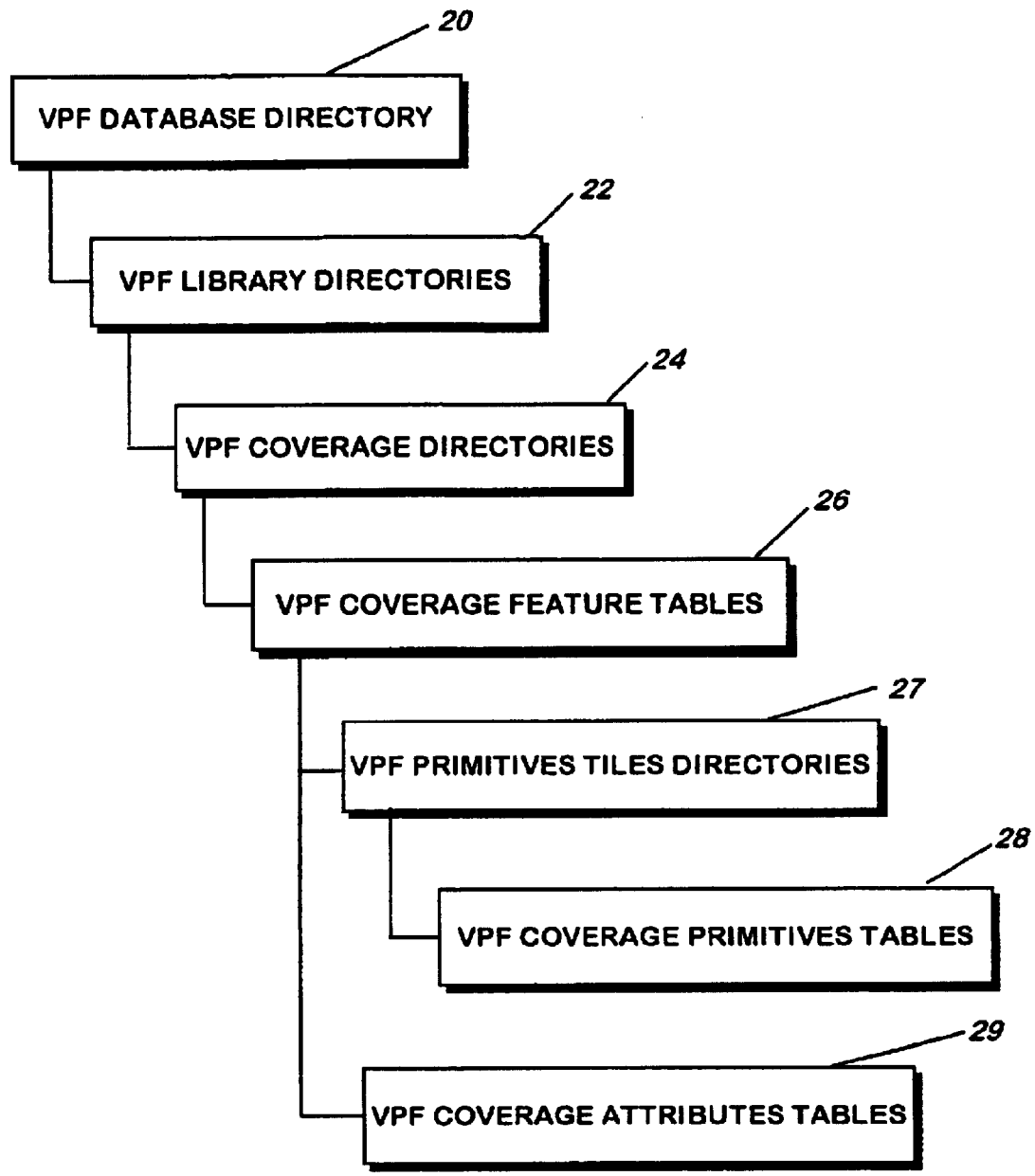
FIG. 2 is a block diagram of the hierarchical directory structure of a relational VPF data structure.
Figure 3:
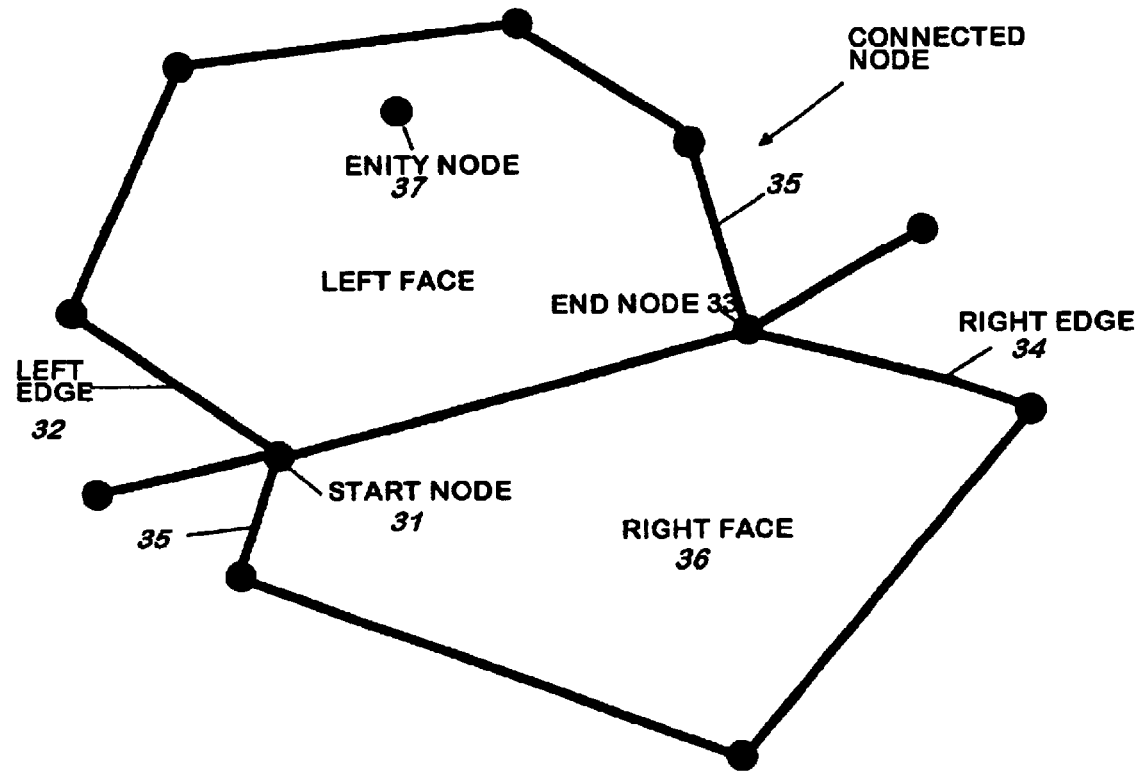
FIG. 3 is a geospatial display using winged-edge topology.
Figure 6:
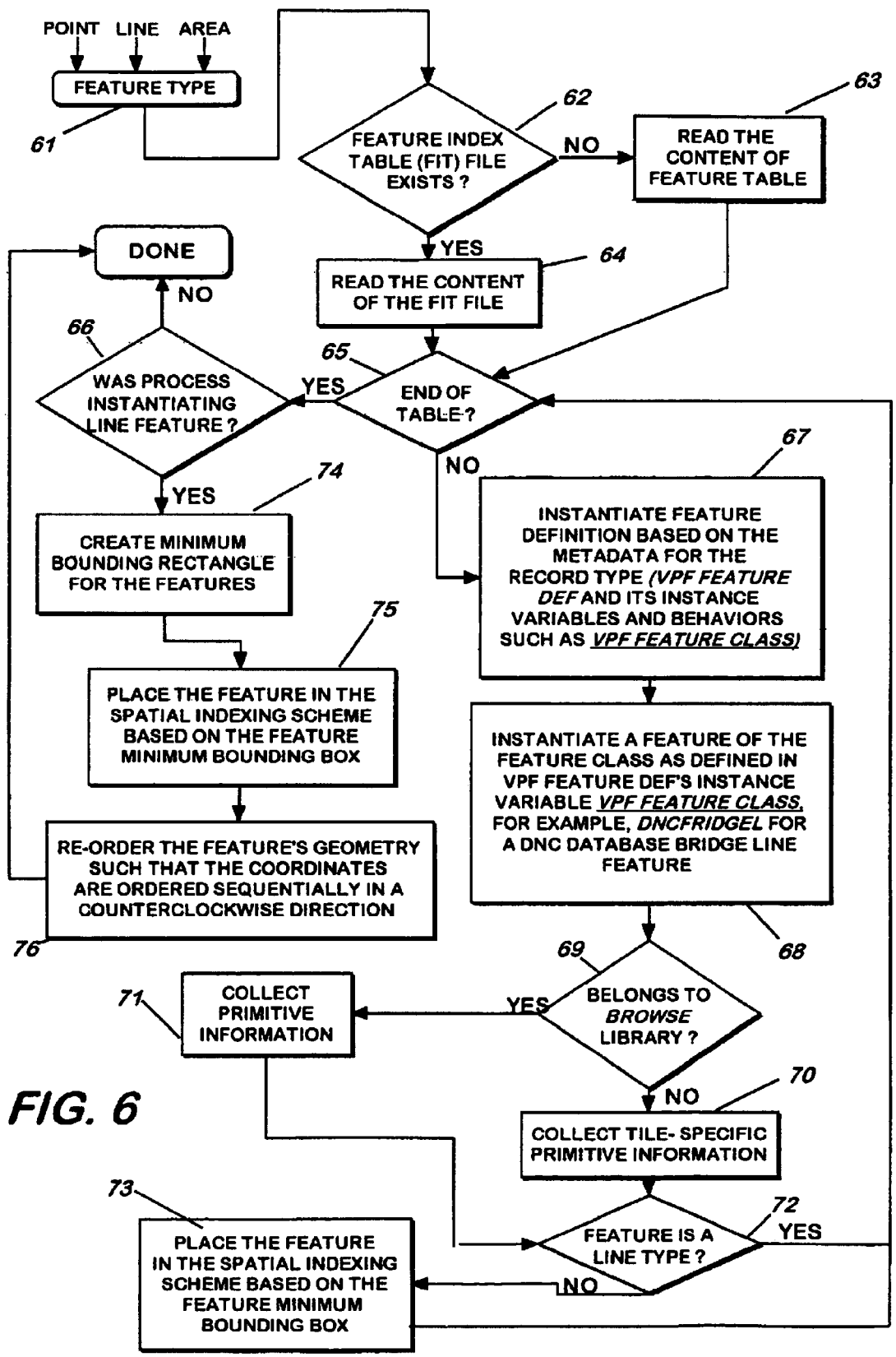
FIG. 6 is a flow chart of the instantiation of the objects of the object-oriented VPF database.

Instantiation is the process of creating the actual instance of an object within an object-oriented schema, or the initializing of objects with real data and is shown in detail in FIG. 6. The system uses the metadata developed at step 50 of the initialization process shown in FIG. 5 with the contents of the VPF primitive tables 28 and the attribute tables 29 of FIG. 2. The process shown in FIG. 6 is an iterative process beginning with step 61 with the processing of an element from one of the feature tables 26 of the relational VPF data structure. The feature type of the element is identified at step 61. At step 62, the system determines whether a feature index table for the element exist. Such a table is built from the feature tables 26 to provide pointers to the various primitive tables 28 and attribute tables 29. Such a table facilitates through its indexing actual acquisition of the relational VPF data and points with which to instantiate the objects of the present invention. Depending on whether a matching feature index table exists, the system either reads the feature index table at step 64 or reads the contents of the relational features table at step 63. If the process is at the end of the table, the process branches to step 66. If not, the feature class and definition of the object are instantiated at steps 67 and 68 based on the metadata created at step 50 of the initialization process shown in FIG. 5.

At step 69, the system queries whether or not the feature is restricted to a browse library. If so, the system collects and instantiates the primitive data at step 71. Otherwise, it collects and instantiates the tile-specific primitive data at step 72. If the feature is a line type, the system returns to step 65 to process the next feature element. If the feature is not a line type, the system places the feature within the spatial indexing scheme as determined by the minimum bounds of the VPF metadata. At step 66, upon encountering the end of the feature index table or feature table, the system determines whether the element is a line feature. If not, the instantiation process is complete for this feature table. If so, a minimum bounding rectangle for each group of linked lines is created at step 74. Next, at step 75, the feature is placed within the spatial indexing scheme as determined by the minimum bounding rectangle from step 74. The system reorders the feature's geometry if necessary such that its coordinates are specified sequentially in counterclockwise order.

Figure 7:
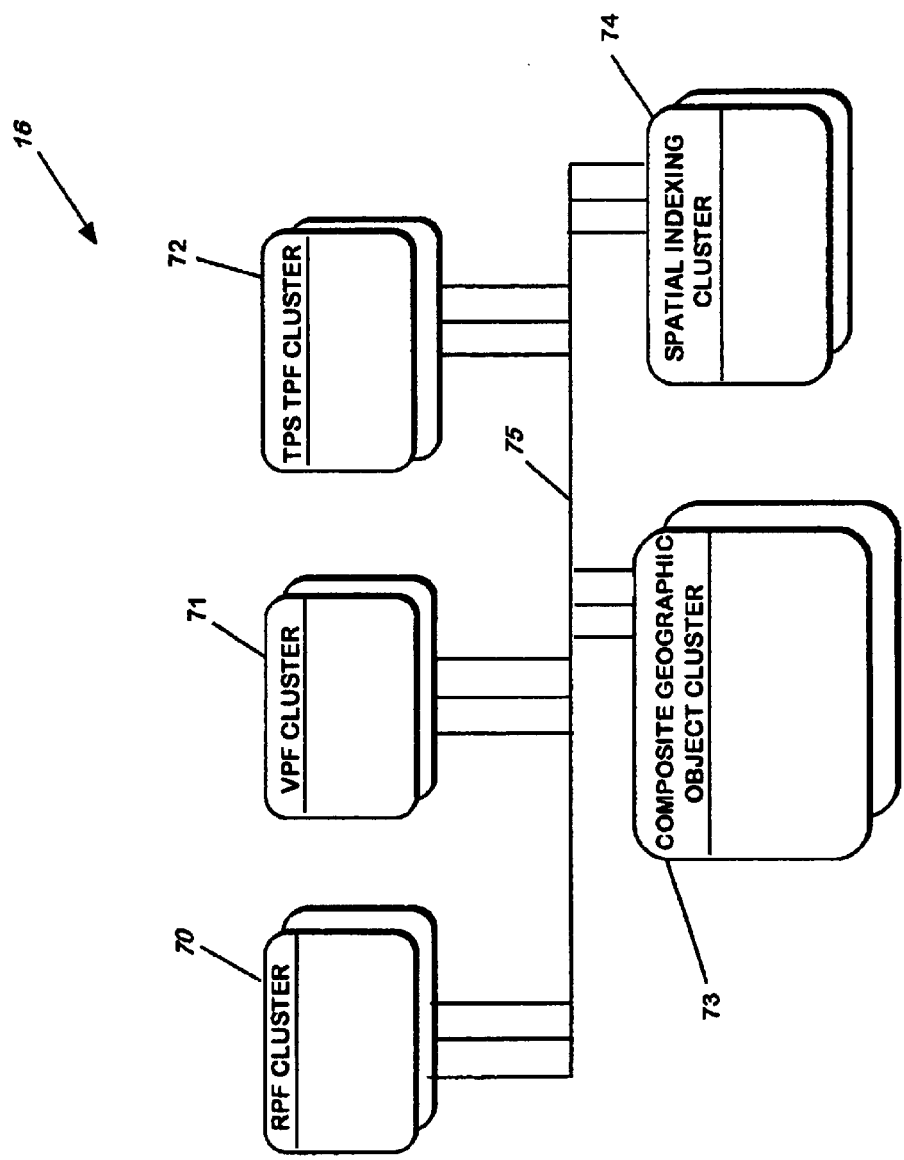
FIG. 7 is a block diagram of the interrelated clusters for spatial indexing.

As discussed above, various software products permit users to query and access NIMA's relational VPF data. Furthermore, RPF and TPS data, being less complex formats, are also presently viewable by users. However, no system presently exists for accessing, querying, and viewing spatial data in VPF, RPF, and TPS formats in a single, integrated platform. Returning again to FIG. 4, at step 44, in a preferred embodiment of the present invention, the invention can simultaneously access spatial data from VPF, RPF, and TPS formats in conjunction with a spatial indexing scheme which permits transparent access to the data from any and all formats which satisfies a particular geospatial query. As discussed above, each of the VPF, RPF, and TPS products have a fundamentally different format which has precluded simultaneous access and analysis of data for a given geographic area that has been compiled in dissimilar formats. By introducing a layer of spatial indexing to the object-oriented VPF database system, as shown in step 44 of FIG. 4, the present invention is able to maintain and manage each product format as an independent, accessible class within a cohesive object-oriented VPF database. Referring now to FIG. 7, a RPF cluster 70, a VPF cluster 71, a TPS cluster 72, a composite geographic object cluster 73, and a spatial indexing cluster 74 are shown, wherein each cluster represents a plurality of elements which are treated herein as a unit. The RPF cluster 70 provides the ability to read metadata files and import raster data for display. The VPF cluster 71 provides effective querying, displaying, and editing of VPF data as well as topology handling and exporting to the relational VPF format. The TPS cluster 72 provides display of SGML documents; hyperlink handling; and associated graphic and tables display, wherein the hyperlinks are text of pointers to other text, all of which may be utilized in the operation of the present invention. The composite geographic object cluster 73 performs the operation of creating composite object links and display handling. The spatial indexing cluster 74 provides structured, indexed data storage and retrieval; individual indexing schemes for each of the VPF, RPF, and TPS products; and integrated indexing scheme for the composition of geographic objects. All of the clusters 70–74 and their associated programming segments communicate with each other by way of a communications bus 75 in a manner known in the art.

To accommodate the differences among the three formats, the concept of a composite geographic object was developed. A composite geographic object is composed of multiple objects from more than one format type. A relationship among objects is the primary criterion in the creation of composite geographic objects. For the multi-format data types accessible with the present invention, if an object from one product format spatially contains, is contained, or intersects another object of a different product format, then a composite geographic object of those two objects will be created. This process is termed spatial indexing and is the process of relating all information of differing data formats together.

Figure 8:
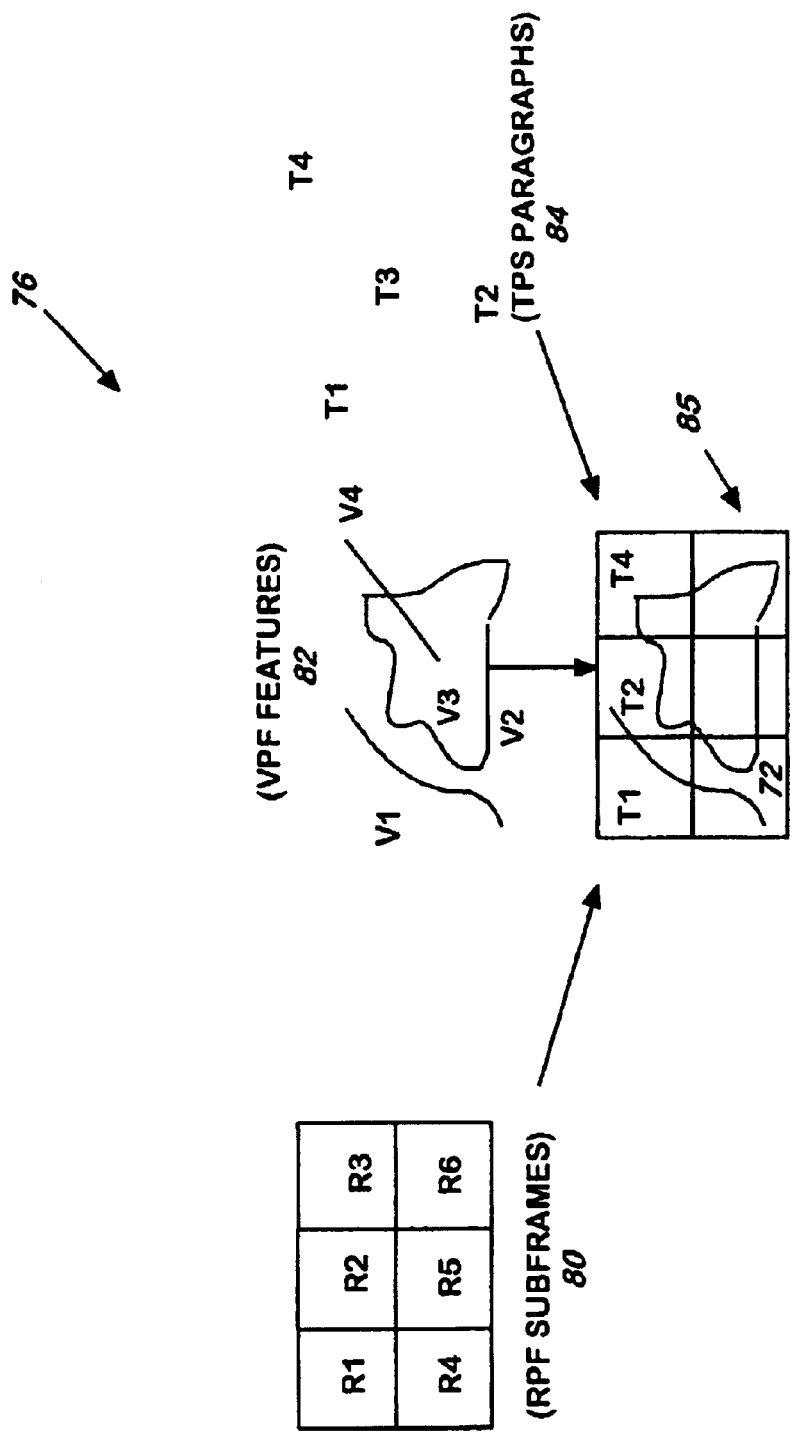
FIG. 8 is a flow diagram showing the creation of a geographic composite object.

FIG. 8 shows the process of spatial indexing whereby objects for RPF subframes 80, VPF features 82, and TPS paragraphs 84 overlap a geographic area and are combined to form the composite geographic object 85. The RPF, VPF, and TPS products 80, 82, and 84 respectively have features R1, R2, R3, R4, R5, and R6; V1, V2, V3, and V4; and T1, T2, T3, and T4. The component objects from each product 80, 82, and 84, along with an overlay of each object, are based on the spatial proximity of objects. For a related collection of objects, the composite geographic object 85 is built by creating pointers to all objects with intersecting bounding boxes, with composite geographic object 85 reflecting the integration of geospatially-related objects from the dissimilar VPF, RPF, and TPS formats. All Features, V1, V2, and V3, from the VPF family; R1, R2, R3, R4, R5, and R6 from the RPF family; and T1, T2, T3, and T4 from the TPS family are members of the composite geographic object candidate set by virtue of their relative spatial proximity to a common area. Topology provides adjacency information among the neighboring objects from the RPF, VPF, and TPS products. Topology, as used herein, relates both to contiguity and adjacency and also to overlap, intersection, and containment.

Spatial data is typically modeled as zero-dimensional points ("0-D"), one-dimensional lines ("1-D"), and two-dimensional areas ("2-D"). VPF, being a vector-based data model, has provisions for all three levels of topology as VPF point, line, and area features, respectfully. Face primitives serving as graphical elements are linked to face bounding rectangles (bounding boxes), which provide a convenient way of determining the extent of area features. Although line features do not have bounding rectangles defined, edge primitives that define each line feature have edge bounding rectangles. A union of those edge bounding rectangles that define each line feature is used herein as a bounding rectangle for each line feature. These bounding rectangles make it convenient to consider line features within the context of 2-D objects.

RPF and TPS formats have no inherent provisions for the concept of dimensionality due to the nature of the data they represent—raster images and textual material. In order to include RPF and TPS format data within a VPF vector paradigm, the present system maps components of RPF and TPS format data to spatial entities with specific dimensionality, similar to those of VPF features. Within the present system, RPF subframes are used as the feature data unit. Since each subframe is essentially a rectangle, RPF data items are treated as 2-D area features. In a similar approach, because each paragraph of TPS data is associated with a single coordinate pair, TPS data items are considered to be 0-D point features.

Although spatial splay tree indexing and R tree indexing are all known and available indexing schemes with which data of VPF, RPF, and TPS formats could be combined through spatial indexing, the present invention uses a quad tree indexing scheme. As is known, quad tree indexing places a spatial object into a cell that would minimally contain the bounding box of the spatial object. In other words, the principle of the indexing scheme implemented by quad tree indexing is based on a recursive subdivision of spatial data into four equal-sized cells or quadrants. Each object feature is placed in the smallest quad tree cell which will completely contain it, thereby creating the integrated geographic object 85 which is a composite object of the features of the RPF subframes 80, the VPF features 82, and the TPS paragraphs 84.

As discussed above, the feature data of the VPF, RPF, and TPS formats have both spatial and non-spatial elements, wherein one of the spatial features specifies the geographic location of the respective item and is capable of being spatially indexed to cluster the data according to spatial proximity. The non-spatial feature data specifies an attribute of the data item and is also capable of being indexed based on the aggregation hierarchy and inheritance hierarchy inherent in object-oriented databases. From the hierarchies of aggregation and inheritance, attribute information may be nested among many levels of classes within an object-oriented paradigm. An early object-oriented indexing scheme is the class-hierarchy indexing scheme. This is based on maintaining one index on an attribute for a hierarchy of classes. The underlying rationale for such an organization is to maintain one index for a class that has n subclasses. The index consists of a pair (key, pointer), with the pointer containing the physical address of the next level index node. Three fundamental hierarchical indexing schemes are contemplated within the present invention; namely, nested index, path index, and multi-index. A path is defined as the traversal along classes to reach an attribute. The nested index provides a direct association between a last object and the corresponding starting object along a path, with only the starting objects along the path to reach an attribute of interest being maintained. The last object is a simple object that does not reference any other objects. A path index records all instantiations that end with the indexed key of interest. The actual key values are object identifiers. The multi-index is a set of n nested indices. The final step of the database creation is shown at step 46 of FIG. 4 to persist, or load the indexed, initialized data to storage available for subsequent computer access for query, update, and/or export.

Figure 9:
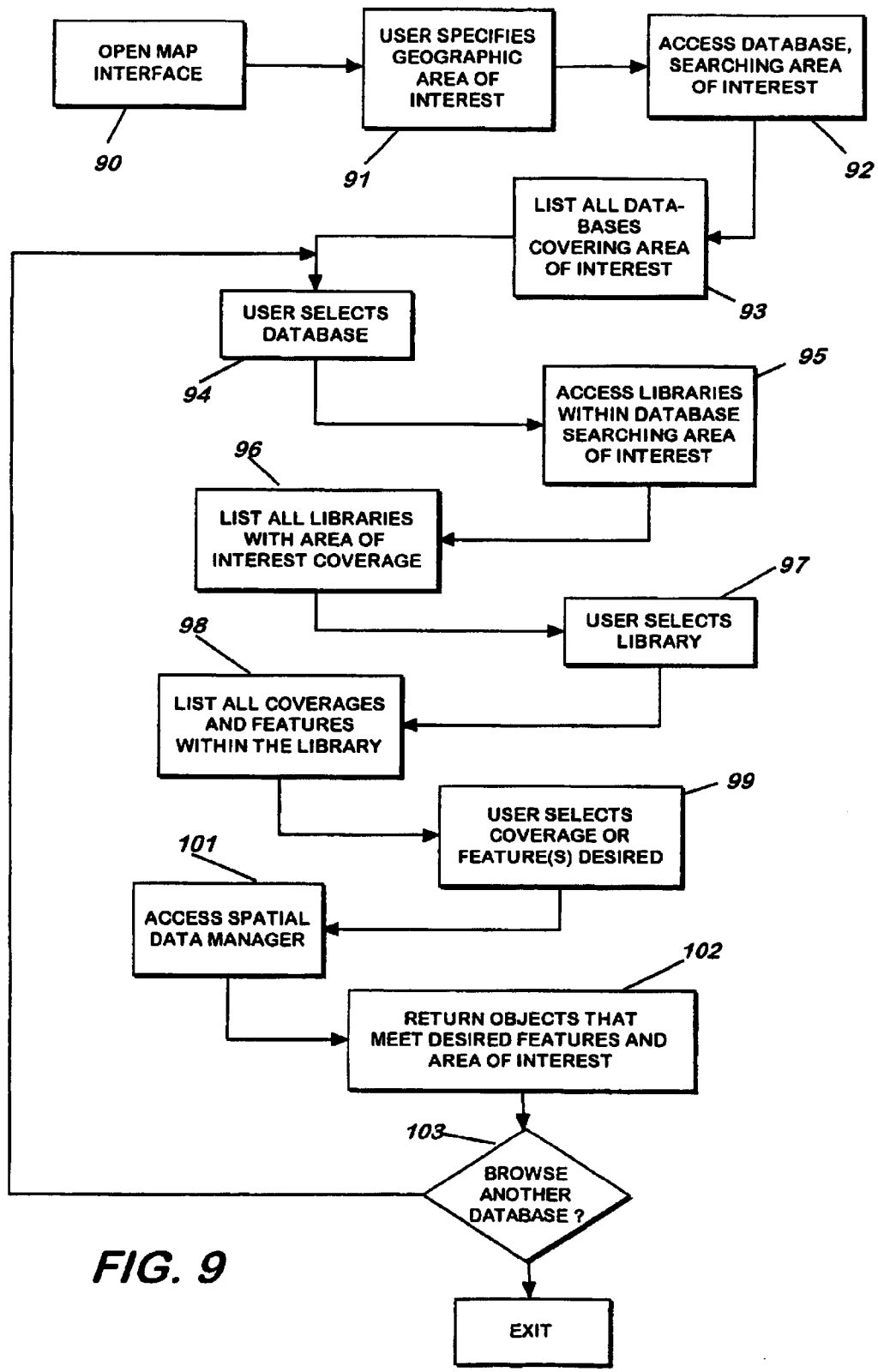
FIG. 9 is a flow chart of a user query of the database.

Once built, the object-oriented VPF database is available for query and updating. Both the spatial and non-spatial aspects of the three data formats of the present invention are used to effectively index the objects for faster queried retrieval and lower storage requirements. Some queries may involve only the non-spatial aspect of the data, e.g. "Find all major highways." However, queries such as "find all major highways that pass through the state of Iowa" require a combination of both spatial and non-spatial attributes as search criteria. Referring now to FIG. 9, the query process of the present invention begins with the user accessing the system, typically through a terminal or graphical user interface (not shown) and electing a query transaction. The system responds at step 90 by opening the map interface to the database. The medium of access could be anything from a stand-alone server on a personal computer to an online international data base, to a web browser. The user specifies at step 91 a geographic area of coverage, either by coordinate points, longitude/latitude coordinates, or a place name optionally selected from a table of place names. The system responds at step 92 by accessing the object-oriented databases, searching for a match between the database of spatial objects and the requested area of interest. This process is shortened by accessing the VPF metadata for the VPF library objects within the database. At step 93, the system lists to the user all databases whose geographic coverage includes at least part of the area of interest, regardless of whether the databases are VPF, RPF, or TPS. The user selects the database of choice at step 94. The system responds at steps 95 and 96 by listing all libraries within the database whose objects at least intersect the geographic area of interest. At step 97, the user selects a library of choice, in response to which the system lists to the user at step 98 all coverages and features covered by the selected library. Exemplary coverages include population, obstruction, hydrography, earth cover, transportation, and navigation. The user then selects at step 99 a coverage or feature(s) desired. To access the entire library, for example, the user would select all listed features. At step 101 the system accesses the spatial data manager to search for all library objects within the geographical area of interest with the desired coverage or feature(s). For VPF databases, a spatial data manager exists for each coverage and each feature type. For RPF databases, a spatial data manager exists for each coverage only. The system searches a quad tree until an area of interest and matching coverage/feature (s) is within a single node. The system then grabs all lower nodes to obtain all qualifying nodes. The system then returns to the user at step 102 all objects within the selected library and database that are within the selected geographic area of interest and comprise attribute information of the coverage or feature(s) selected. It is important to note that the actual objects are delivered to the user, not just a map or overlay of the qualifying area. The user can view the selected objects at this point or save them for future processing or even examine the attribute information of a feature by clicking a mouse on a displayed feature. The user then has the choice at step 103 of terminating the query or returning to step 94 to select another database to query.

Advanced or constrained queries are possible with the present invention. For example, the user can search for particular attributes of a feature, such as "all bridges that exist." Under such a search, the system finds the lowest node on the quad tree that satisfies the attribute constraint. The system looks at each child of the node and delivers those objects that have the attribute. A search for a geometric constraint would be "all buildings within 50 miles." The system finds all objects containing the sought features, then calculates the direction and distances, and if the distance is within the specified limit, add the qualifying objects to the found list. An example of a topological constraint is "all roads contained within Washington, D.C." The topological search is similar to that for geometric constraints, except the system looks to match a proximity relationship, such as intersects, meets, contains, overlaps, disjointed, or contained by. Topological constraints are distinguishable from geometric constraints in that the former constraints are unaffected by scaling differences or changes. Also, the search can be made by geographic region, with no feature or attribute requirements. Finally, query parameters can be boolean, and the various constraints can be combined, mixed, and matched within a single search.

Figure 10:
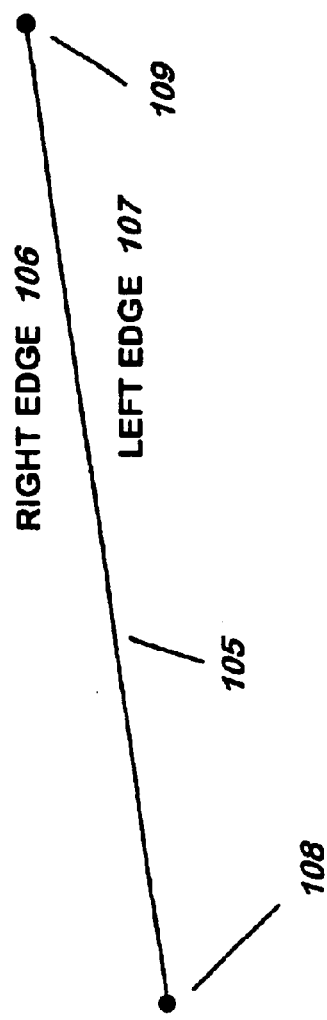
FIG. 10 is a diagram of a line feature with its corresponding edge information.
Figure 11:
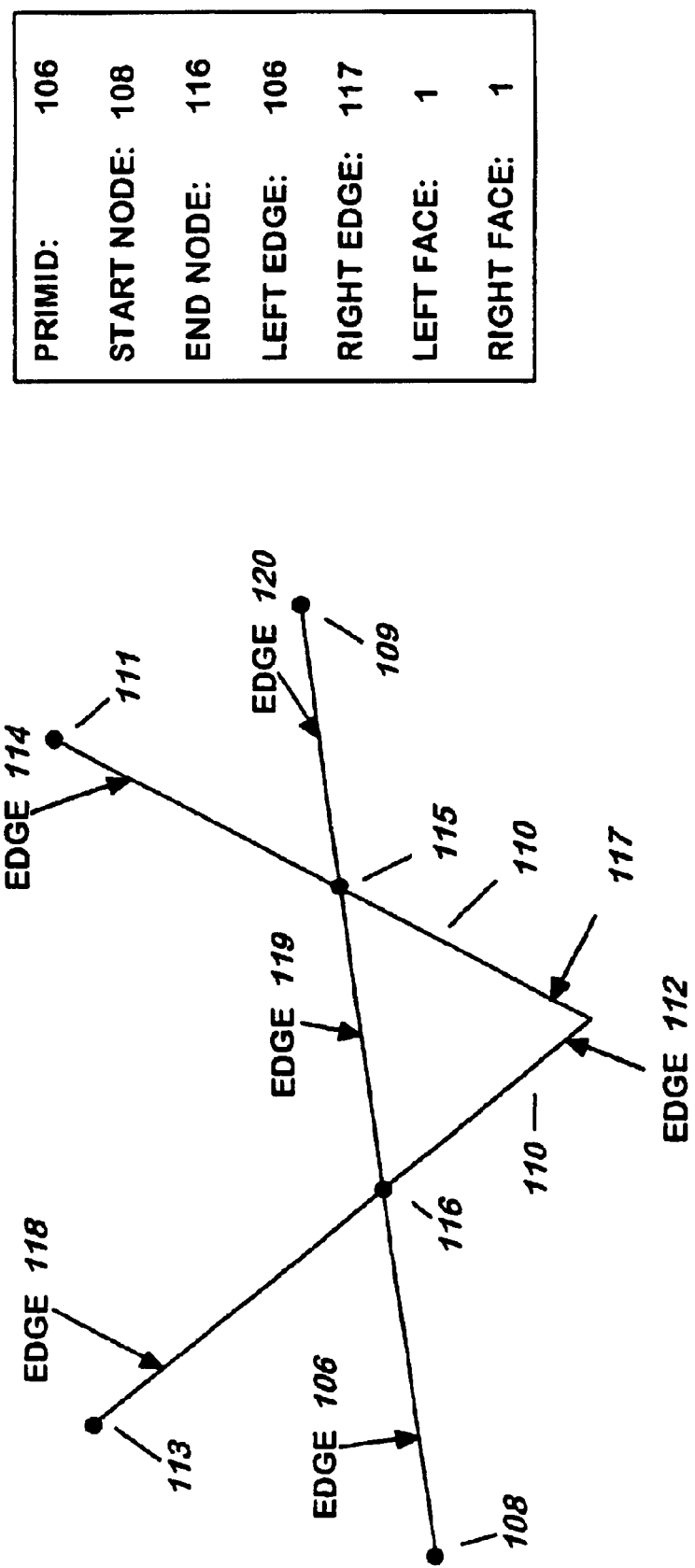
FIG. 11 is a diagram of the winged-edge topology of the result of adding a new line feature to an existing edge feature, along with the topological information of the resultant feature.

A significant benefit of the present invention is the ability to modify the database contents while maintaining the integrity of all pointers and linkages. The ease of updating is accomplished by storing the data in object format in which all the information about a feature is encapsulated in an object. Referring now to FIG. 10, an original line 105 is shown with its edge information. The line can also be perceived as a right edge 106 intersecting another (left) edge 107 between start node 108 and end node 109. FIG. 11 shows the resulting winged-edge topology by adding to line 105 a new line feature 110 defined by three coordinate points, 111–113, each at a vertex. Originally, this new feature is created as edge 114 with start node 111 and end node 113. The two lines 105 and 110 intersect at locations 115 and 116. The topology update from the line addition is shown in the corresponding table and results in the creation of two other edges, 117 and 118, for the new line feature and also for the intersecting line feature. Each feature is completely defined by its primitive information and maintains its own primitive information. Since each feature's symbol has direct object pointers to its collection of spatial primitives, updating and maintaining topology is greatly facilitated.

Figure 12:
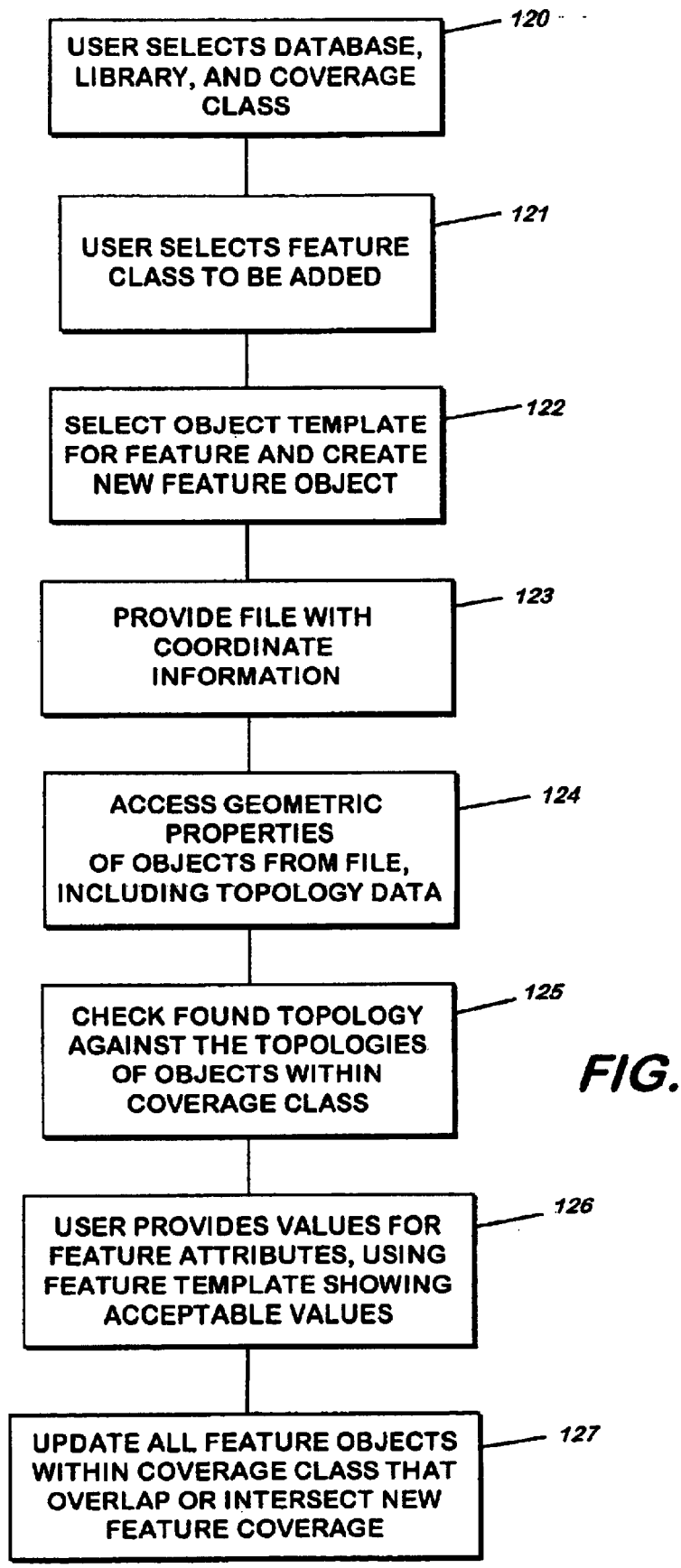
FIG. 12 is a flow chart of the feature add process.

The process by which the system adds features is shown in the flow chart of FIG. 12. The update process starts at step 120 where the user selects the database, library, and coverage class in which the feature is to be added. At step 121, the user selects the feature class to be added from a database of available features for the database, library, and/or coverage. The system selects the object template corresponding to the selected feature at step 122 and creates a new feature object. At step 123 the user provides the system with the appropriate coordinate data. The system accesses the geometric properties of the objects from the database, including topology data. At step 125 the system checks the found object topology against the topologies of the objects within the selected coverage class, seeking objects whose geometric data overlaps or intersects the coverage area of the new feature. At step 126 the user provides values for the feature's attributes, using the features template which shows acceptable attribute values. At step 127 the system updates all feature objects, including topological links, within the coverage class that overlap or intersect the new feature coverage.

Figure 13:
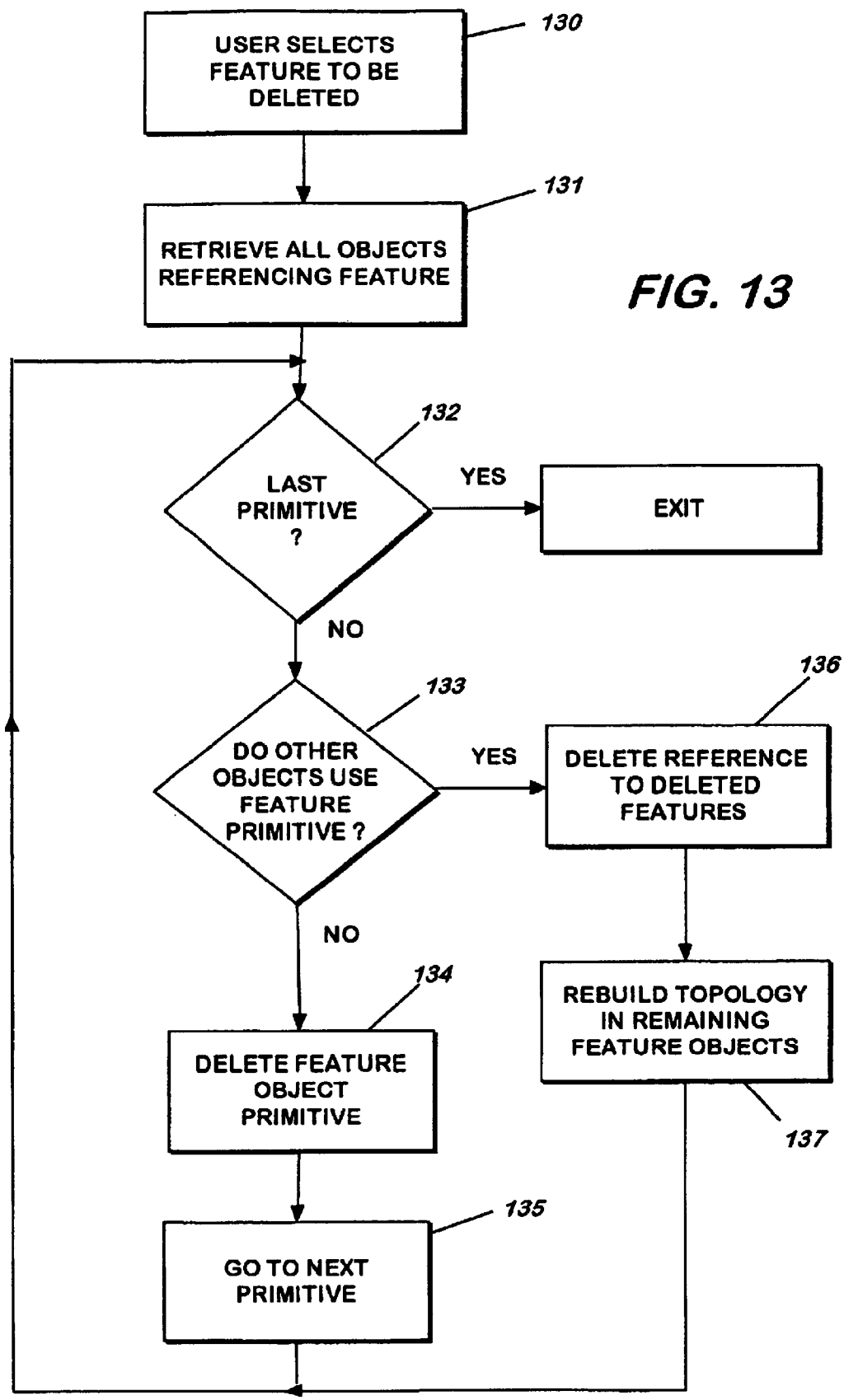
FIG. 13 is a flow chart of the feature delete process.

Referring now to FIG. 13, the process for deleting a feature from the object-oriented data base is detailed. The deletion process starts at step 130 where the user selects a feature to be deleted from a coverage class. At step 131, the system retrieves all objects that reference the feature and proceeds to evaluate the primitives of each found object, one by one. At step 133, if no other object has the same primitive, the feature object is deleted at step 134, and the process continues with the next object until the last primitive has been evaluated. If the primitive is shared with another feature, then the system branches to step 136, where the feature object to be deleted is eliminated. Then, at step 137, the primitive data in the formerly shared objects is rebuilt to remove the link to the deleted feature.

The above discussion reflects the delete process within an object-oriented paradigm in which elements cannot be simply deleted without first checking whether any other objects link to or reference the element being eliminated. Here, if the primitives of the feature to be deleted are shared by other features (i.e., other features have object pointers to the same primitive as the feature to be deleted), then the primitive should not be released—the feature should simply be released from the collection of features that share this primitive. The advantage of this system over the relational VPF database is that the present invention deals with direct object pointer references, without the need to maintain join tables or primary/secondary key values at the time of each update. The update process for the object-oriented VPF database is a combination of the above add and delete processes as the system verifies that the appropriate primitive, feature, and link data is properly maintained.

In a preferred embodiment of the present invention, the integrated object-oriented system also provides a facility to easily export the spatial data from the object-oriented structure to a relational VPF format database. The process for doing so is essentially the reverse of the initialization process. Such a feature is desirable because many users have existing software packages in use that require spatial data to be in relational VPF format. Since the RPF and TPS data is not updated by the present system, there is no real need to export this data from the object-oriented format. The export process of the VPF data begins with the rebuilding of tables and directories of the relational database from the metadata files that were created herein during the initialization process. Then the feature data from the objects is exported into the relational database structure to populate the relational VPF database.

It should now be apparent that the present invention provides a framework for defining, indexing, and accessing spatial data by geographic location and feature similarities, even when the underlying data is drawn from databases having distinctly different formats and coverages.

It should be further apparent that specific data sets involved in this invention preferably include vector, raster, and text data from NIMA's VPF, RPF, and TPS product lines, respectively. The mapping information may be used independently of each other even though there is a wealth of information when the three formats of data are used concurrently. However, even if the information is used together, VPF information may be displayed on one window, TPS may be displayed on another window, and raster data may be output in hardcopy or displayed on yet another window. All mapping information has geographic information. Such a commonality is used as a basis of developing an integrated framework that allows a user to access all relevant information on a single platform independent of the data family.

Based on object-oriented technology, the implementation of the multi-data framework of the present invention can be realized by using object pointers to create composite geographic objects with encapsulated data regarding each object type. Topology is required and is specified only for the vector data. However, for a object-oriented framework integrated across data formats, it is necessary to know topological relationships among objects of different data types and coverages to create integrated, composite geographic objects.

The spatial indexing scheme of quad tree indexing and the non-spatial attribute indexing scheme both are used by the present invention. The quad tree indexing scheme is used to find the vicinity of the sought criteria. Then, the other object-oriented indexing schemes based on attribute (nested index, path index, and multi-index) may be used within the selected vicinity of the searching criteria.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method of building and maintaining an object-oriented database from a vector product format (VPF) database, said method comprising:

instantiating objects of the object-oriented database, using the VPF database;

initializing spatial and non-spatial feature data of the object-oriented database;

spatially indexing data among objects across hierarchical levels of the object-oriented database;

updating data of the object-orientated database; and exporting contents of the updated object-oriented database to the VPF database.

2. A method of building and maintaining an object-oriented database from a vector product format (VPF) database, said method comprising:

instantiating objects of the object-oriented database, using the VPF database;

initializing spatial and non-spatial feature data of the object-oriented database;

spatially indexing data among objects across hierarchical levels of the object-oriented database; and updating spatial and non-spatial data.

3. The method according to claim 2, wherein said initializing spatial and non-spatial feature data creates a feature level having non-spatial data which provides characteristic properties of each feature, and spatial data, including primitive data and topological information, which provides spatial relationships between a feature object and other feature objects within a specified coverage; and wherein related non-spatial and spatial data are directly accessible from the feature object.

4. The method according to claim 3, wherein said updating spatial and non-spatial data includes adding, changing, and deleting feature, primitive, and topological data within the database and further includes updating all object links referencing the feature, primitive, and topological data.

5. The method according to claim 2, wherein said spatially indexing data is applied to one or more databases whose format comprises:

a flat file;

a raster product format;

a vector product format; or a text format.

6. The method according to claim 5, further comprising retrieving data objects matching a user-specified query based on at least one of the following data characteristics:

feature attributes;

geometrical constraints;

topological constraints; and geographical constraints.

7. The method according to claim 6, wherein said retrieving data objects includes retrieving:

a flat file;

a raster image;

a VPF feature; or text data.

* * * * *